(12) United States Patent
Dubucq et al.

(10) Patent No.: US 11,010,246 B2
(45) Date of Patent: *May 18, 2021

(54) MULTIPLE WRITES USING INTER-SITE STORAGE UNIT RELATIONSHIP

(71) Applicant: International Business Machines Corporation, Armonk, NY (US)

(72) Inventors: Thomas Dubucq, Chicago, IL (US); Daniel J. Scholl, Chicago, IL (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/508,572

(22) Filed: Jul. 11, 2019

(65) Prior Publication Data

US 2019/0332475 A1 Oct. 31, 2019

Related U.S. Application Data

(63) Continuation of application No. 15/173,201, filed on Jun. 3, 2016, now Pat. No. 10,394,650.

(51) Int. Cl.
*G06F 3/06* (2006.01)
*G06F 11/10* (2006.01)

(52) U.S. Cl.
CPC .......... *G06F 11/1076* (2013.01); *G06F 3/061* (2013.01); *G06F 3/064* (2013.01); *G06F 3/067* (2013.01); *G06F 3/0619* (2013.01)

(58) Field of Classification Search
CPC .... G06F 11/1076; G06F 3/061; G06F 3/0619; G06F 3/064; G06F 3/067

USPC ........................................................ 714/764
See application file for complete search history.

(56) References Cited

U.S. PATENT DOCUMENTS

| 4,092,732 | A | 5/1978 | Ouchi |
| 5,454,101 | A | 9/1995 | Mackay et al. |
| 5,485,474 | A | 1/1996 | Rabin |
| 5,774,643 | A | 6/1998 | Lubbers et al. |

(Continued)

OTHER PUBLICATIONS

Chung; An Automatic Data Segmentation Method for 3D Measured Data Points; National Taiwan University; pp. 1-8; 1998.

(Continued)

*Primary Examiner* — Samir W Rizk
*Assistant Examiner* — Enam Ahmed
(74) *Attorney, Agent, or Firm* — James Nock; Andrew D. Wright; Roberts Calderon Safran & Cole. P.C.

(57) ABSTRACT

A method includes registering, by a first computing device, with a distributed storage network (DSN) to indicate that a first storage site is connected via a common local area network with the first computing device and is the primary storage site for the first computing device. The method continues with the first computing device to store a write threshold number of encoded data slices (EDSs) to the first storage site, obtaining a first writing pattern for writing the write threshold number of EDSs to the first plurality of storage units, and transmitting at least a portion of a remaining number of EDSs to one or more storage units at a second storage site, where the remaining number of EDSs are EDSs not included in the write threshold number of EDSs and the second storage site and the first storage site are each one of a sharing group of storage sites.

20 Claims, 19 Drawing Sheets write pattern 50 for site 1 as LAN connection

| site 1 SU 1 | s 1 |
| site 1 SU 2 | s 2 |
| site 1 SU 3 | s 3 |
| site 1 SU 4 | s 4 |
| site 1 SU 5 | s 5 |
| site 1 SU 6 | s 6 |
| site 1 SU 7 | s 7 |
| site 1 SU 8 | s 8 |
| site 1 SU 9 | s 9 |
| site 1 SU 10 | s 10 |
| site 2 SU 1 | s 11 |
| site 2 SU 2 | s 12 |

(56) References Cited

U.S. PATENT DOCUMENTS

| | | | |
|---|---|---|---|
| 5,802,364 | A | 9/1998 | Senator et al. |
| 5,809,285 | A | 9/1998 | Hilland |
| 5,890,156 | A | 3/1999 | Rekieta et al. |
| 5,987,622 | A | 11/1999 | Lo Verso et al. |
| 5,991,414 | A | 11/1999 | Garay et al. |
| 6,012,159 | A | 1/2000 | Fischer et al. |
| 6,058,454 | A | 5/2000 | Gerlach et al. |
| 6,128,277 | A | 10/2000 | Bruck et al. |
| 6,175,571 | B1 | 1/2001 | Haddock et al. |
| 6,192,472 | B1 | 2/2001 | Garay et al. |
| 6,256,688 | B1 | 7/2001 | Suetaka et al. |
| 6,272,658 | B1 | 8/2001 | Steele et al. |
| 6,301,604 | B1 | 10/2001 | Nojima |
| 6,356,949 | B1 | 3/2002 | Katsandres et al. |
| 6,366,995 | B1 | 4/2002 | Vilkov et al. |
| 6,374,336 | B1 | 4/2002 | Peters et al. |
| 6,415,373 | B1 | 7/2002 | Peters et al. |
| 6,418,539 | B1 | 7/2002 | Walker |
| 6,449,688 | B1 | 9/2002 | Peters et al. |
| 6,567,948 | B2 | 5/2003 | Steele et al. |
| 6,571,282 | B1 | 5/2003 | Bowman-Amuah |
| 6,609,223 | B1 | 8/2003 | Wolfgang |
| 6,718,361 | B1 | 4/2004 | Basani et al. |
| 6,760,808 | B2 | 7/2004 | Peters et al. |
| 6,785,768 | B2 | 8/2004 | Peters et al. |
| 6,785,783 | B2 | 8/2004 | Buckland |
| 6,826,711 | B2 | 11/2004 | Moulton et al. |
| 6,879,596 | B1 | 4/2005 | Dooply |
| 7,003,688 | B1 | 2/2006 | Pittelkow et al. |
| 7,024,451 | B2 | 4/2006 | Jorgenson |
| 7,024,609 | B2 | 4/2006 | Wolfgang et al. |
| 7,080,101 | B1 | 7/2006 | Watson et al. |
| 7,103,824 | B2 | 9/2006 | Halford |
| 7,103,915 | B2 | 9/2006 | Redlich et al. |
| 7,111,115 | B2 | 9/2006 | Peters et al. |
| 7,140,044 | B2 | 11/2006 | Redlich et al. |
| 7,146,644 | B2 | 12/2006 | Redlich et al. |
| 7,171,493 | B2 | 1/2007 | Shu et al. |
| 7,222,133 | B1 | 5/2007 | Raipurkar et al. |
| 7,240,236 | B2 | 7/2007 | Cutts et al. |
| 7,272,613 | B2 | 9/2007 | Sim et al. |
| 7,636,724 | B2 | 12/2009 | de la Torre et al. |
| 9,009,567 | B2* | 4/2015 | Baptist ................ H04L 67/1097 |
| | | | 714/764 |
| 10,073,645 | B2* | 9/2018 | McShane .............. G06F 3/0635 |
| 10,394,650 | B2 | 8/2019 | Dubucq et al. |
| 2002/0062422 | A1 | 5/2002 | Butterworth et al. |
| 2002/0166079 | A1 | 11/2002 | Ulrich et al. |
| 2003/0018927 | A1 | 1/2003 | Gadir et al. |
| 2003/0037261 | A1 | 2/2003 | Meffert et al. |
| 2003/0065617 | A1 | 4/2003 | Watkins et al. |
| 2003/0084020 | A1 | 5/2003 | Shu |
| 2004/0024963 | A1 | 2/2004 | Talagala et al. |
| 2004/0122917 | A1 | 6/2004 | Menon et al. |
| 2004/0215998 | A1 | 10/2004 | Buxton et al. |
| 2004/0228493 | A1 | 11/2004 | Ma |
| 2005/0100022 | A1 | 5/2005 | Ramprashad |
| 2005/0114594 | A1 | 5/2005 | Corbett et al. |
| 2005/0125593 | A1 | 6/2005 | Karpoff et al. |
| 2005/0131993 | A1 | 6/2005 | Fatula |
| 2005/0132070 | A1 | 6/2005 | Redlich et al. |
| 2005/0144382 | A1 | 6/2005 | Schmisseur |
| 2005/0229069 | A1 | 10/2005 | Hassner et al. |
| 2006/0047907 | A1 | 3/2006 | Shiga et al. |
| 2006/0136448 | A1 | 6/2006 | Cialini et al. |
| 2006/0156059 | A1 | 7/2006 | Kitamura |
| 2006/0224603 | A1 | 10/2006 | Correll |
| 2007/0079081 | A1 | 4/2007 | Gladwin et al. |
| 2007/0079082 | A1 | 4/2007 | Gladwin et al. |
| 2007/0079083 | A1 | 4/2007 | Gladwin et al. |
| 2007/0088970 | A1 | 4/2007 | Buxton et al. |
| 2007/0174192 | A1 | 7/2007 | Gladwin et al. |
| 2007/0214285 | A1 | 9/2007 | Au et al. |
| 2007/0234110 | A1 | 10/2007 | Soran et al. |
| 2007/0283167 | A1 | 12/2007 | Venters et al. |
| 2009/0094251 | A1 | 4/2009 | Gladwin et al. |
| 2009/0094318 | A1 | 4/2009 | Gladwin et al. |
| 2010/0023524 | A1 | 1/2010 | Gladwin et al. |
| 2012/0027134 | A1 | 2/2012 | Gladwin et al. |
| 2013/0275833 | A1 | 10/2013 | Thornton et al. |
| 2014/0068358 | A1 | 3/2014 | Yang et al. |
| 2014/0122970 | A1* | 5/2014 | Dhuse .................... H04L 67/02 |
| | | | 714/764 |
| 2014/0344646 | A1* | 11/2014 | Vas ....................... G06F 3/0614 |
| | | | 714/764 |
| 2015/0067295 | A1 | 3/2015 | Storm et al. |
| 2015/0255144 | A1 | 9/2015 | Giovannini et al. |
| 2017/0272539 | A1* | 9/2017 | Wozniak ............. G06F 16/2455 |

OTHER PUBLICATIONS

Harrison; Lightweight Directory Access Protocol (LDAP): Authentication Methods and Security Mechanisms; IETF Network Working Group; RFC 4513; Jun. 2006; pp. 1-32.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

Legg; Lightweight Directory Access Protocol (LDAP): Syntaxes and Matching Rules; IETF Network Working Group; RFC 4517; Jun. 2006; pp. 1-50.

Plank, T1: Erasure Codes for Storage Applications; FAST2005, 4th Usenix Conference on File Storage Technologies; Dec. 13-16, 2005; pp. 1-74.

Rabin; Efficient Dispersal of Information for Security, Load Balancing, and Fault Tolerance; Journal of the Association for Computer Machinery; vol. 36, No. 2; Apr. 1989; pp. 335-348.

Satran, et al.; Internet Small Computer Systems Interface (iSCSI); IETF Network Working Group; RFC 3720; Apr. 2004; pp. 1-257.

Sciberras; Lightweight Directory Access Protocol (LDAP): Schema for User Applications; IETF Network Working Group; RFC 4519; Jun. 2006; pp. 1-33.

Sermersheim; Lightweight Directory Access Protocol (LDAP): The Protocol; IETF Network Working Group; RFC 4511; Jun. 2006; pp. 1-68.

Shamir; How to Share a Secret; Communications of the ACM; vol. 22, No. 11; Nov. 1979; pp. 612-613.

Smith; Lightweight Directory Access Protocol (LDAP): String Representation of Search Filters; IETF Network Working Group; RFC 4515; Jun. 2006; pp. 1-12.

Smith; Lightweight Directory Access Protocol (LDAP): Uniform Resource Locator; IETF Network Working Group; RFC 4516; Jun. 2006; pp. 1-15.

Wildi; Java iSCSi Initiator; Master Thesis; Department of Computer and Information Science, University of Konstanz; Feb. 2007; 60 pgs.

Xin, et al.; Evaluation of Distributed Recovery in Large-Scale Storage Systems; 13th IEEE International Symposium on High Performance Distributed Computing; Jun. 2004; pp. 172-181.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): Directory Information Models; IETF Network Working Group; RFC 4512; Jun. 2006; pp. 1-49.

Zeilenga; Lightweight Directory Access Protocol (LDAP): Internationalized String Preparation; IETF Network Working Group; RFC 4518; Jun. 2006; pp. 1-14.

Zeilenga; Lightweight Directory Access Protocol (LDAP): String Representation of Distinguished Names; IETF Network Working Group; RFC 4514; Jun. 2006; pp. 1-15.

List of IBM Patents or Patent Applications Treated as Related, dated Oct. 23, 2020, 1 page.

* cited by examiner

| write pattern 50 for site 1 as LAN connection | |
|---|---|
| site 1 SU 1 | s 1 |
| site 1 SU 2 | s 2 |
| site 1 SU 3 | s 3 |
| site 1 SU 4 | s 4 |
| site 1 SU 5 | s 5 |
| site 1 SU 6 | s 6 |
| site 1 SU 7 | s 7 |
| site 1 SU 8 | s 8 |
| site 1 SU 9 | s 9 |
| site 1 SU 10 | s 10 |
| site 2 SU 1 | s 11 |
| site 2 SU 2 | s 12 |

FIG. 3

| write pattern 52 for site 2 as LAN connection | |
|---|---|
| site 2 SU 3 | s 1 |
| site 2 SU 4 | s 2 |
| site 2 SU 5 | s 3 |
| site 2 SU 6 | s 4 |
| site 2 SU 7 | s 5 |
| site 2 SU 8 | s 6 |
| site 2 SU 9 | s 7 |
| site 2 SU 10 | s 8 |
| site 1 SU 9 | s 9 |
| site 1 SU 10 | s 10 |
| site 2 SU 1 | s 11 |
| site 2 SU 2 | s 12 |

FIG. 4

| inter-site storage unit relationship 54 | |
|---|---|
| site 1 | site 2 |
| SU 1 | SU 3 |
| SU 2 | SU 4 |
| SU 3 | SU 5 |
| SU 4 | SU 6 |
| SU 5 | SU 7 |
| SU 6 | SU 8 |
| SU 7 | SU 9 |
| SU 8 | SU 10 |
| SU 9 | na |
| SU 10 | na |
| na | SU 1 |
| na | SU 2 |

FIG. 5

| write pattern 70 for site 1 as LAN connection | |
|---|---|
| site 1 SU 1 | s 1 |
| site 1 SU 2 | s 2 |
| site 1 SU 3 | s 3 |
| site 1 SU 4 | s 4 |
| site 1 SU 5 | s 5 |
| site 1 SU 6 | s 6 |
| site 1 SU 7 | s 7 |
| site 1 SU 8 | s 8 |
| site 1 SU 9 | s 9 |
| site 1 SU 10 | s 10 |
| site 2 SU 1 | s 11 |
| site 2 SU 2 | s 12 |

FIG. 11

| write pattern 74 for site 2 as LAN connection | |
|---|---|
| site 1 SU 1 | s 1 |
| site 1 SU 2 | s 2 |
| site 2 SU 3 | s 3 |
| site 2 SU 4 | s 4 |
| site 2 SU 5 | s 5 |
| site 2 SU 6 | s 6 |
| site 2 SU 7 | s 7 |
| site 2 SU 8 | s 8 |
| site 2 SU 9 | s 9 |
| site 2 SU 10 | s 10 |
| site 2 SU 1 | s 11 |
| site 2 SU 2 | s 12 |

FIG. 12

| write pattern 76 for site 3 as LAN connection | |
|---|---|
| site 3 SU 1 | s 1 |
| site 3 SU 2 | s 2 |
| site 3 SU 3 | s 3 |
| site 3 SU 4 | s 4 |
| site 3 SU 5 | s 5 |
| site 3 SU 6 | s 6 |
| site 3 SU 7 | s 7 |
| site 3 SU 8 | s 8 |
| site 3 SU 9 | s 9 |
| site 3 SU 10 | s 10 |
| site 2 SU 1 | s 11 |
| site 2 SU 2 | s 12 |

FIG. 13

| inter-site storage unit relationship 78 | | |
|---|---|---|
| site 1 | site 2 | site 3 |
| SU 1 | na | SU 1 |
| SU 2 | na | SU 2 |
| SU 3 | SU 3 | SU 3 |
| SU 4 | SU 4 | SU 4 |
| SU 5 | SU 5 | SU 5 |
| SU 6 | SU 6 | SU 6 |
| SU 7 | SU 7 | SU 7 |
| SU 8 | SU 8 | SU 8 |
| SU 9 | SU 9 | SU 9 |
| SU 10 | SU 10 | SU 10 |
| na | SU 1 | na |
| na | SU 2 | na |

FIG. 14

| write pattern 90 for site 1 as LAN connection | |
|---|---|
| site 1 SU 1 | s 1 |
| site 1 SU 2 | s 2 |
| site 1 SU 3 | s 3 |
| site 1 SU 4 | s 4 |
| site 1 SU 5 | s 5 |
| site 2 SU 1 | s 6 |
| site 2 SU 2 | s 7 |
| site 2 SU 3 | s 8 |
| site 2 SU 4 | s 9 |
| site 2 SU 5 | s 10 |
| site 3 SU 1 | s 11 |
| site 3 SU 2 | s 12 |

FIG. 21

| write pattern 92 for site 2 as LAN connection | |
|---|---|
| site 1 SU 1 | s 1 |
| site 1 SU 2 | s 2 |
| site 1 SU 3 | s 3 |
| site 1 SU 4 | s 4 |
| site 1 SU 5 | s 5 |
| site 2 SU 1 | s 6 |
| site 2 SU 3 | s 7 |
| site 2 SU 4 | s 8 |
| site 2 SU 5 | s 9 |
| site 2 SU 1 | s 10 |
| site 3 SU 1 | s 11 |
| site 3 SU 2 | s 12 |

FIG. 22

| write pattern 94 for site 3 as LAN connection | |
|---|---|
| site 3 SU 1 | s 11 |
| site 3 SU 2 | s 12 |
| site 3 SU 3 | s 1 |
| site 3 SU 4 | s 2 |
| site 3 SU 5 | s 3 |
| site 1 SU 4 | s 4 |
| site 1 SU 5 | s 5 |
| site 2 SU 1 | s 6 |
| site 2 SU 3 | s 7 |
| site 2 SU 4 | s 8 |
| site 2 SU 5 | s 9 |
| site 2 SU 5 | s 10 |

FIG. 23

| inter-site storage unit relationship 96 | | |
|---|---|---|
| site 1 | site 2 | site 3 |
| SU 1 | na | na |
| SU 2 | na | na |
| SU 3 | na | na |
| SU 4 | na | na |
| SU 5 | na | na |
| na | SU 1 | na |
| na | SU 2 | na |
| na | SU 3 | na |
| na | SU 4 | na |
| na | SU 5 | na |
| na | na | SU 1 |
| SU 1 | na | SU 2 |
| SU 2 | na | SU 3 |
| SU 3 | na | SU 4 |
| | | SU 5 |

FIG. 24

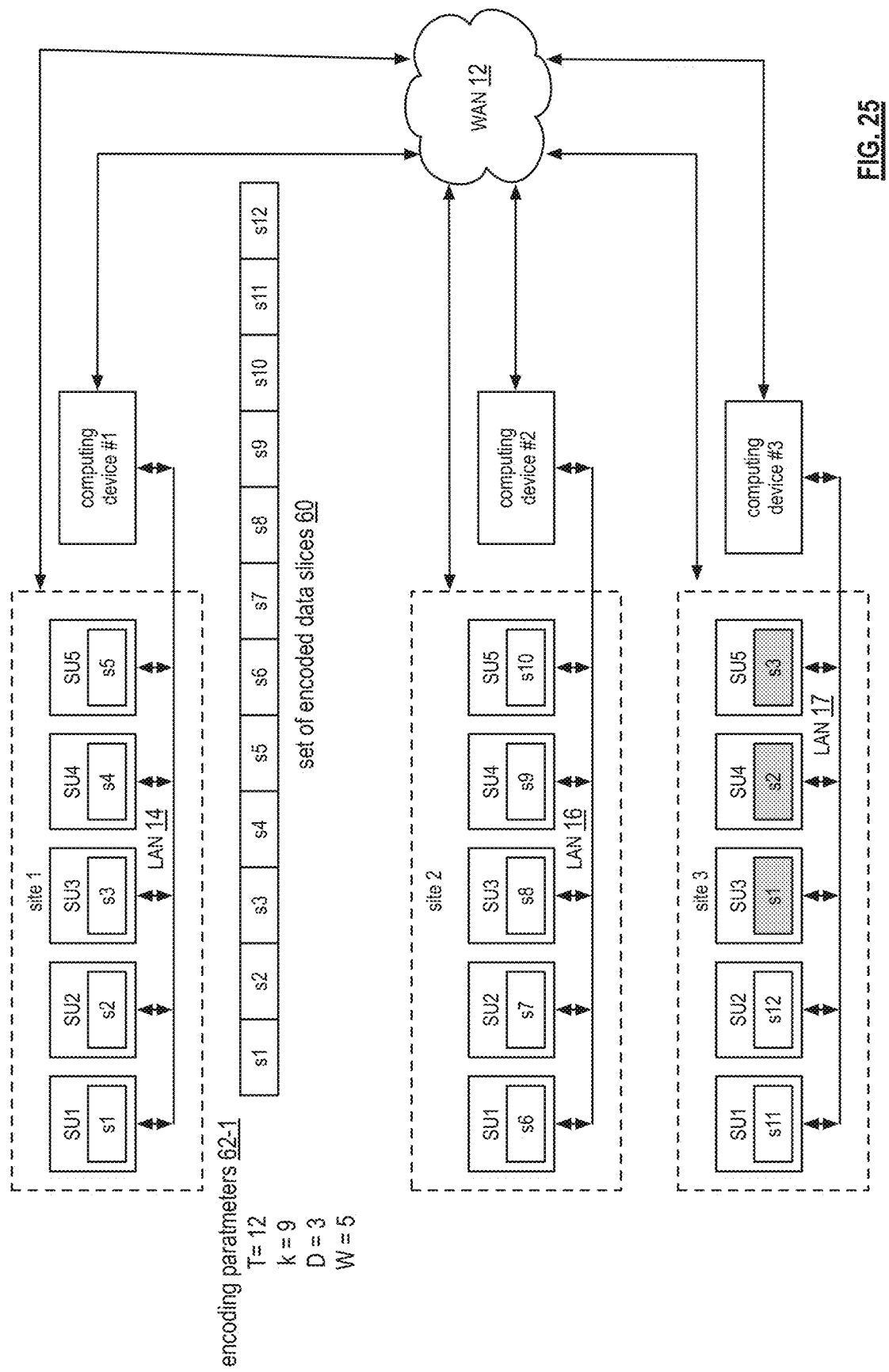

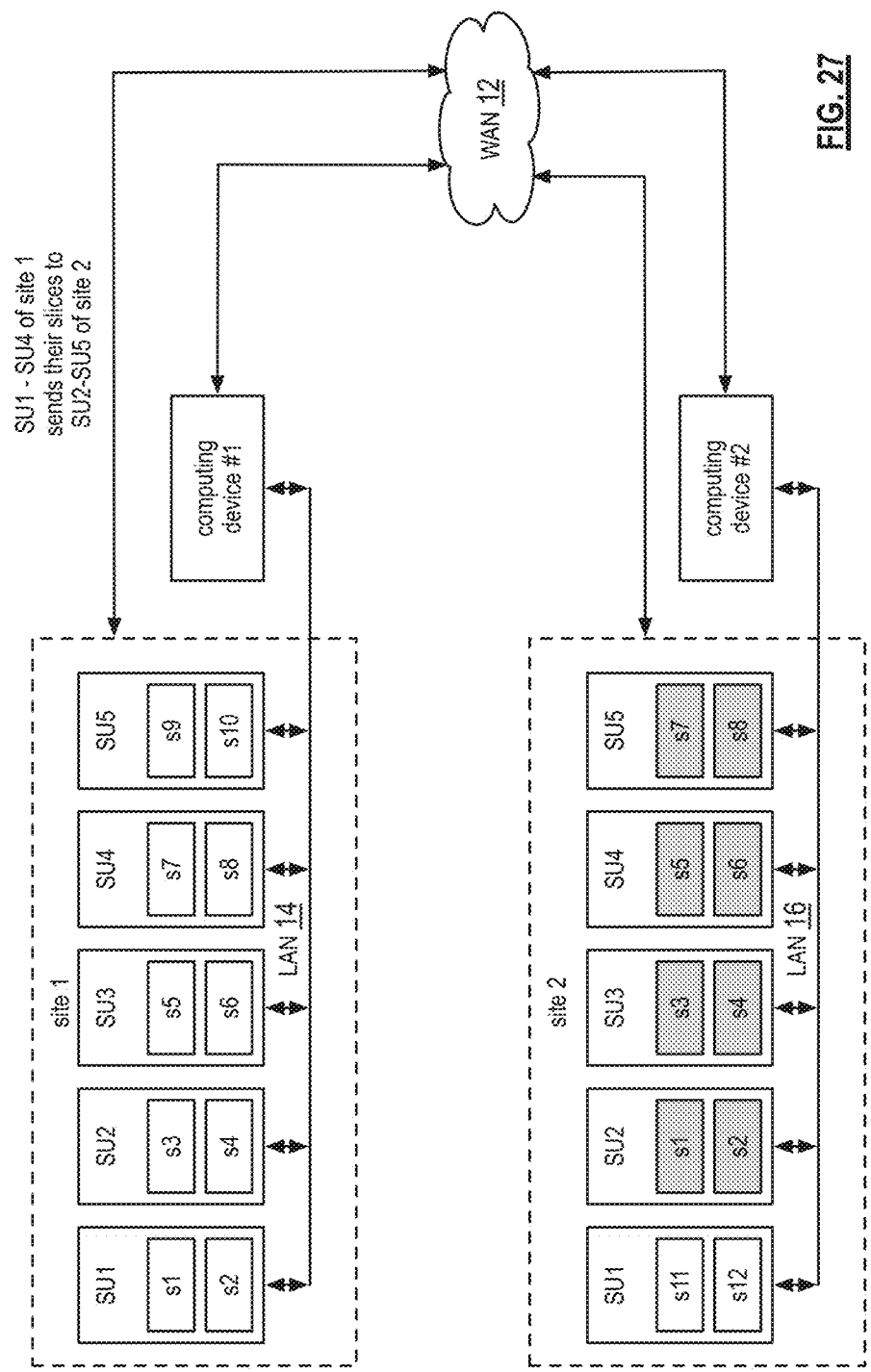

MULTIPLE WRITES USING INTER-SITE STORAGE UNIT RELATIONSHIP

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

The present invention relates generally to computer networks and more particularly to dispersed storage of data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 3 is a diagram of an example of a first write pattern in accordance with the present invention;

FIG. 4 is a diagram of an example of a second write pattern in accordance with the present invention;

FIG. 5 is a diagram of an example of an inter-site storage unit relationship in accordance with the present invention;

FIG. 11 is a diagram of another example of a first write pattern in accordance with the present invention;

FIG. 12 is a diagram of another example of a second write pattern in accordance with the present invention;

FIG. 13 is a diagram of another example of a third write pattern in accordance with the present invention;

FIG. 14 is a diagram of another example of an inter-site storage unit relationship in accordance with the present invention;

FIG. 21 is a diagram of another example of a first write pattern in accordance with the present invention;

FIG. 22 is a diagram of another example of a second write pattern in accordance with the present invention;

FIG. 23 is a diagram of another example of a third write pattern in accordance with the present invention;

FIG. 24 is a diagram of another example of an inter-site storage unit relationship in accordance with the present invention;

FIG. 25 is a schematic block diagram of another example of a write operation to sharing group of sites in accordance with the present invention; and FIGS. 26 and 27 are schematic block diagrams of another example of a write operation to sharing group of sites in accordance with the present invention.

DETAILED DESCRIPTION OF THE INVENTION

Figure 1:
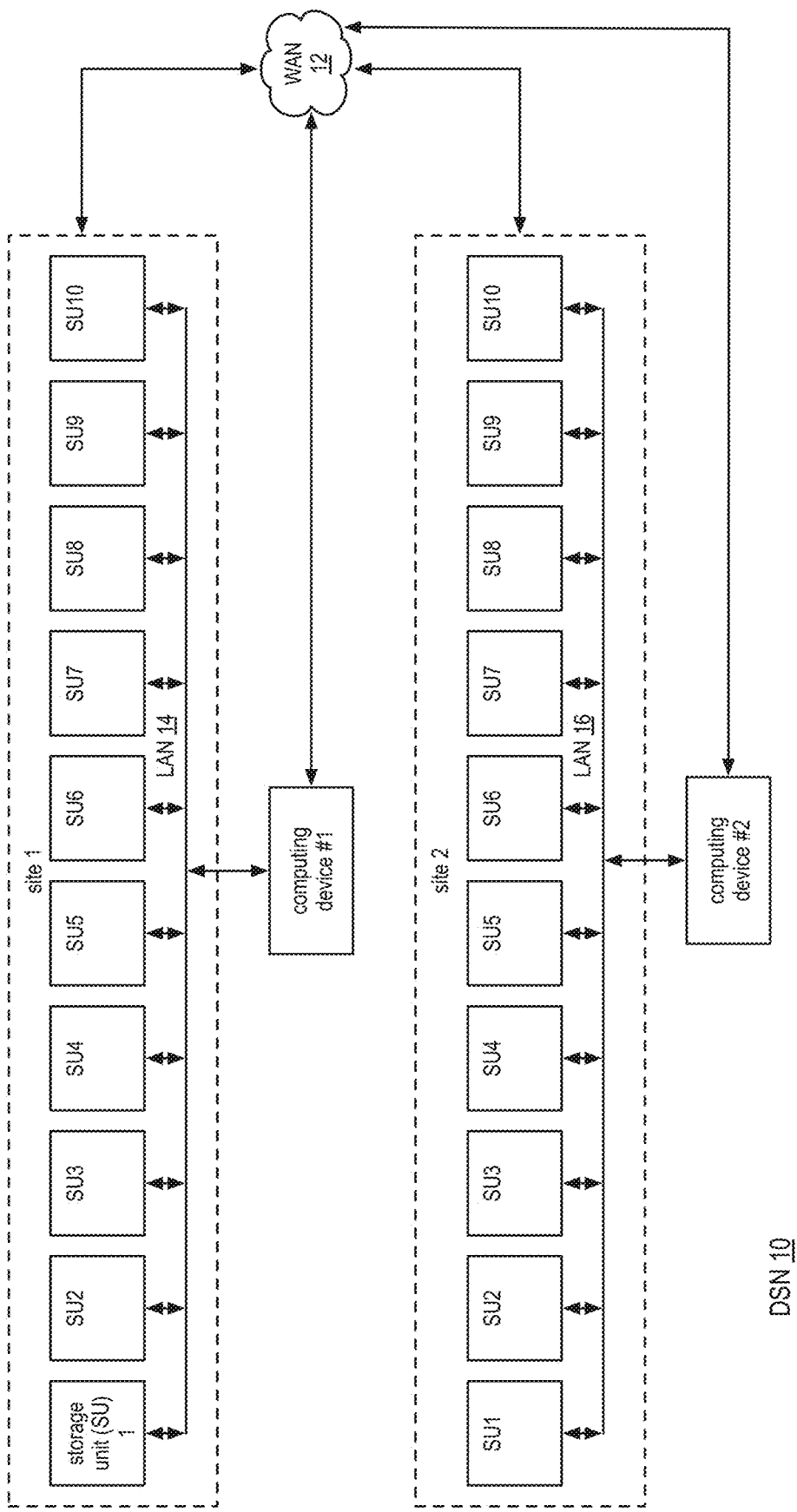
FIG. 1 is a schematic block diagram of an embodiment of a distributed or dispersed storage network (DSN) in accordance with the present invention.

FIG. 1 is a schematic block diagram of an embodiment of a distributed or dispersed storage network (DSN) 10 that includes a plurality of computing devices (two shown), a wide area network (WAN) 12, and a plurality of sites (two shown). Each site 1 and 2 includes a plurality of storage units (e.g., SU 1-10). Within a site, the storage units are coupled together via a local area network (LAN) 14 and/or 16 or some other direction connection other than through the WAN 12. WAN 12 includes one or more network types. For example, WAN 12 includes one or more wireless and/or one or more wire lined communication systems. As another example, WAN 12 includes one or more non-public intranet systems and/or public internet systems. Note that the DSN may include more sites and/or more computing devices and each site may have more or less than 10 storage units. Further note that the DSN may further include a managing unit, an integrity unit, and/or other system administrative devices. Still further note that a site may include more storage units that are not coupled to the LAN 14 or 16.

Each of the computing devices (1 and 2) may be a portable computing device and/or a fixed computing device.

A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. In an embodiment, each of the computing devices (1 and 2) includes, at a minimum, a computing core as shown in FIG. 2 to execute one or more computing device functions described herein.

Figure 2:
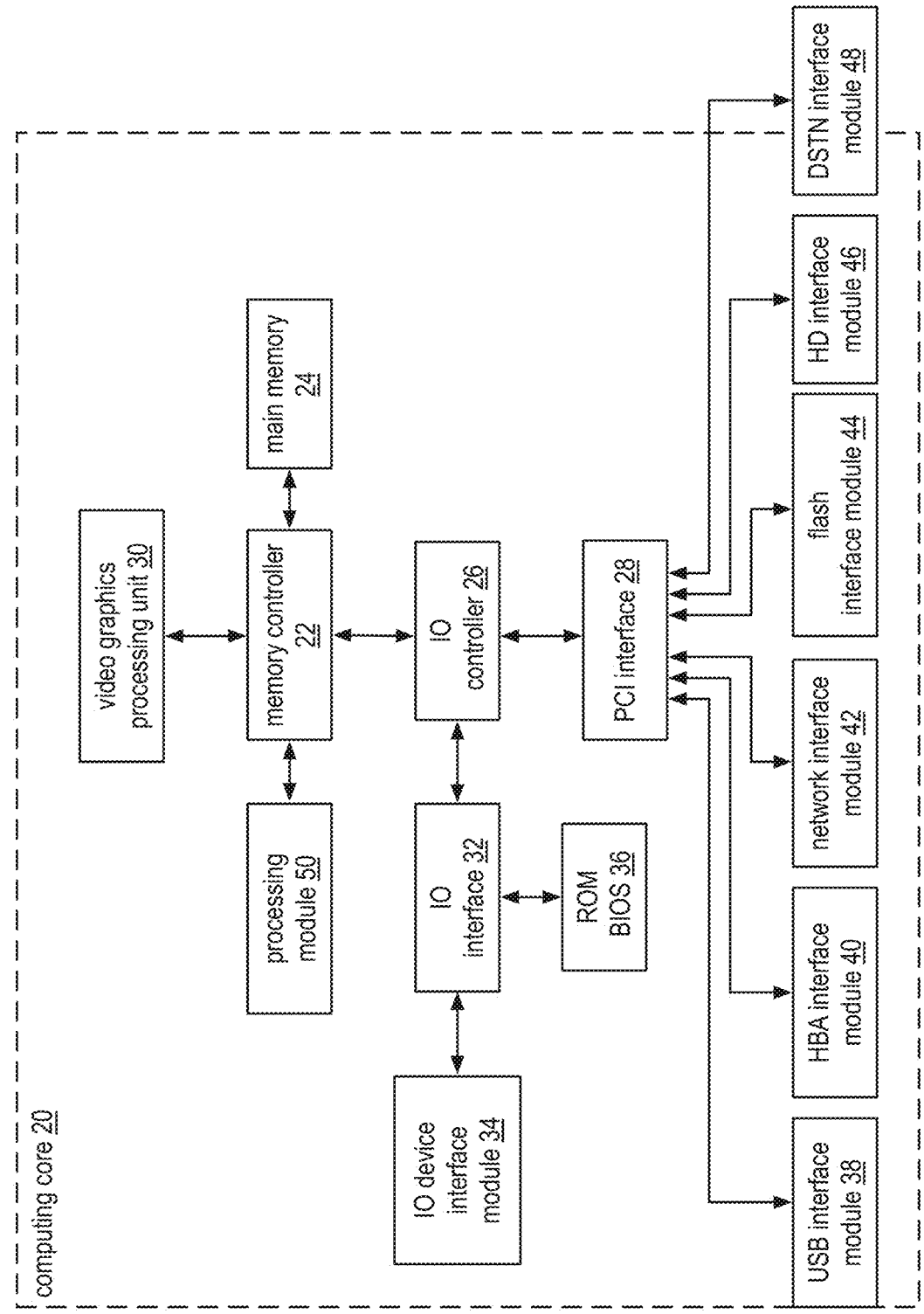
FIG. 2 is a schematic block diagram of an embodiment of a computing core in accordance with the present invention.

Each of the storage units (SU1-10 of each site 1 and 2) includes a computing core as shown in FIG. 2 to execute one or more storage unit functions described herein. A storage unit may omit the video graphics processing unit 30 (of FIG. 2), the IO device interface module 34 (of FIG. 2), and/or one or more of the modules 38 and 40 (of FIG. 2) of the computing core. A storage unit may further include a plurality of memory devices to support storage of a large amount of data. For example, a storage unit includes at least one-hundred 4 Tera-Byte hard drives to store 400 Tera-Bytes of data. A storage unit further includes a LAN interface and a WAN interface. Note that a function (computing device or storage unit) may be described via an example and/or via an operational description.

In general, when a computing device 1 or 2 has data to store in storage units of the DSN 10, it divides the data (e.g., a file (e.g., text, video, audio, etc.), a data object, or other data arrangement) into a plurality of data segments. The computing device then disperse storage error encodes a data segment to produce a set of encoded data slices. As a result of encoding, the computing device produces a plurality of sets of encoded data slices, which are provided to the storage units for storage.

The dispersed storage error encoding is done in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), a total number of encoded data slices per encoding of a data segment by the encoding function (e.g., a pillar width number (T)), a decode threshold number (D) of encoded data slices of a set of encoded data slices that are needed to recover the data segment, a read threshold number (R) to indicate a number of encoded data slices per set to be read from storage for decoding, and/or a write threshold number (W) to indicate a number of encoded data slices per set that must be accurately stored before the encoded data segment is deemed to have been properly stored.

As an example, the following selections are made for dispersed storage error encoding: Cauchy Reed-Solomon as the encoding function, a data segmenting protocol, a pillar width of 16, a decode threshold of 10, a read threshold of 11, and a write threshold of 13. The data is divided into a plurality of data segments in accordance with the data segmenting protocol (e.g., divide the data into AA sized data segments (e.g., Kilo-bytes to Tera-bytes or more). The number of data segments created is dependent of the size of the data and the data segmenting protocol.

To encode a data segment, the data segment is divided into Y number of data blocks and arranged into a data matrix of D rows (which corresponds to the decode threshold number) by Z columns (where Z=Y/D and Y is selected based on desired data size of the data blocks (e.g., a few bytes to Giga-bytes or more)). The data matrix is multiplied by an encoding matrix of the encoding function to produce a coded matrix of T rows (which corresponds to the total number of encoded data slices per set) by Z columns of coded values. The set of encoded data slices is produced from the coded matrix (e.g., a row corresponds to an encoded data slice). The computing device sends the set of encoded data slices to storage units for storage therein.

In an embodiment of the DSN, sites have a sharing relationship. The sharing relationship allows for a computing device to issue one set of write requests regarding a set of encoded data slices to some storage units within a sharing group of sites (e.g., two or more sites, each having a number of storage units affiliated with the sharing group of sites) and the identified storage units facilitate storage of one or more copies of set of encoded data slices to other storage units within the sharing group of sites. Further, the storage units within a site of the sharing group of sites store a decode threshold number, or more, of encoded data slices for a set of encoded data slices to expedite data access requests for the set of encoded data slices.

As an example, DSN 10 includes ten sites. Sites 1 and 2 of the DSN have a sharing relationship (e.g., form a sharing group of sites); Sites 3-6 have a second sharing relationship (e.g., form a second sharing group of sites); Sites 7-10 have a third sharing relationship (e.g., form a third sharing group of sites); and sites 1, 3, 5, 7, and 9 have a fourth sharing relationship (e.g., form a fourth sharing group of sites). Within a sharing group: each site will store a decode threshold number, or more, of encoded data slices, but have at least some different encoded data slices of a set of encoded data slices to provide redundancy for the other site(s).

In an example of operation, a computing device #1 is affiliated with site 1 via a direct connection to the LAN 14, by registering with the DSN 10 and indicating that site 1 is its home site, etc. When computing device #1 has a set of encoded data slices to write storage units of the DSN, it obtains (e.g., retrieves, creates, requests, selects based on being affiliated with the first site, etc.) a first writing pattern. The first writing pattern is one of a plurality of writing patterns (e.g., there may be a separate writing pattern for each site within the sharing group of sites, there may be two writing patterns, where one writing pattern is shared by two or more sites, etc.). The first writing pattern includes writing a write threshold number (e.g., W) of encoded data slices to storage units of site #1 and writing a remaining number (e.g., =pillar width number (T)−W) of encoded data slices to one or more storage units of another site, or sites of the sharing group of sites. Various example of the writing patterns and storing encoded data slices based thereon are described in one or more the subsequent figures.

The storage units of site 1 send copies of their respective encoded data slices to storage units of other sites in the sharing group of sites in accordance with an inter-site storage unit relationship. The storage units of the other site that received the remaining encoded data slices may also send copies of their respective encoded data slices to still other storage units of other sites in the sharing group of sites in accordance with the inter-site storage unit relationship. The inter-site storage unit relationship ensures that each site stores a desired number of encoded data slices (e.g., the write threshold number). Various example of the inter-site storage unit relationship and sending encoded data slices based thereon to other storage units are described in one or more the subsequent figures.

In one example, the sharing groups of sites are determined by a system administrator or other entity and stored such that the sharing groups may be accessed by a computing device via a look up table, a determination based on computer device affiliation with a site and/or DSN, and/or a query-response protocol. In alternative example, the sharing group is created by selecting the sites from a plurality of sites. The sharing group may be created for the computing device for this particular write operation, a series of write operations, and/or for all data accesses of the computing device; is created for a group of computing devices to which the computing device belongs; and/or is created based on a data usage threshold. The sharing group may be created by the computing device, system administrator, or other entity in the DSN.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSTN interface module 76.

The DSTN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSTN interface module 76 and/or the network interface module 70 may function as the interface 30 of the user device 14 of FIG. 1. Further note that the IO device interface module 62 and/or the memory interface modules may be collectively or individually referred to as IO ports. Note that one or more of FIGS. 3-27 are illustrative examples of one or more methods implemented by a computing core of the computing device and/or of the storage units.

FIGS. 3-5 provide examples for a two site sharing group, wherein computing devices affiliated with the first site will use a first writing pattern 50 and computing devices affiliated with the second site will use the second writing pattern 52. Once a set of encoded data slices have been writing to the sharing group in accordance with the first or second writing pattern, the storage units use the inter-site storage unit relationship 54 to copy encoded data slices to other storage units in the sharing group of sites. The write patterns 50 and 52 and the inter-site storage unit relationship 54 are dependent on the number of sites in the sharing group and upon the dispersed storage error encoding parameters.

In this example, the dispersed storage error encoding parameters include a total number (T) of twelve and a write threshold number (W) of ten. FIG. 3 shows the first write pattern 50 of ten encoded data slices (s1-s10) being written to ten storage units (SU1-SU10) of site 1 and the remaining two encoded data slices (s11 & s12) being written to two storage units (SU1 & SU2) of site 2. FIG. 4 shows the second write pattern 52 of the first eight encoded data slices (s1-s8) being written to eight storage units (SU3-SU10) of site 2, the next two encoded data slices (s9 & s10) being written to storage units SU9 and SU10 of site 1, and the last two encoded data slices (s11 & s12) being written to storage units SU1 & SU2 of site 2.

A comparison of the two writing patterns shows that encoded data slices s9 and s10 are written to storage units 9 and 10 of site 1 regardless of whether the first computing device (e.g., affiliated with site 1) or the second computing device (e.g., affiliated with site 2) wrote the encoded data slices. Similarly, encoded data slices s11 and s12 are written to storage units 1 and 2 of site 2. Encoded data slices s1-s8 are stored in different storage units depending on whether the first or the second computing device does the writing. When the first computing device does the writing, encoded data slices s1-s8 are stored in storage units SU1-SU8 of site 1 and when the second computing device does the writing, encoded data slices s1-s8 are stored in storage units SU3-SU10 of site 2.

The inter-site storage unit relationship 54 of FIG. 5 essentially provides instructions to the storage units of the sharing group of sites as to whether to send a copy of a newly stored encoded data slice to its corresponding storage unit of another site. For example, storage unit SU1 of site 1 has a corresponding storage unit of SU3 of site 2. Thus, if storage unit SU1 of site 1 receives an encoded data slice for storage, it sends a copy of the encoded data slice to storage unit SU3 of site 2 for storage therein. Similarly, if storage unit SU3 of site 2 receives the encoded data slice for storage, it sends a copy of the encoded data slice to storage unit SU1 of site 1 for storage therein.

As shown, storage units SU1-SU8 of site 1 have corresponding storage units SU3-SU10 of site 2 and will storage and copy encoded data slices as discussed above. Storage units SU9 and SU10 of site 1 do not have corresponding storage units in site 2 because regardless of which writing pattern is used, storage units SU9 and SU10 store encoded data slices s9 and s10, respectively. Storage units SU1 and SU2 of site 2 also do not have corresponding storage units of site 1 since they store encoded data slices s11 and s12, respectively, regardless of which writing pattern is used.

Figure 6:
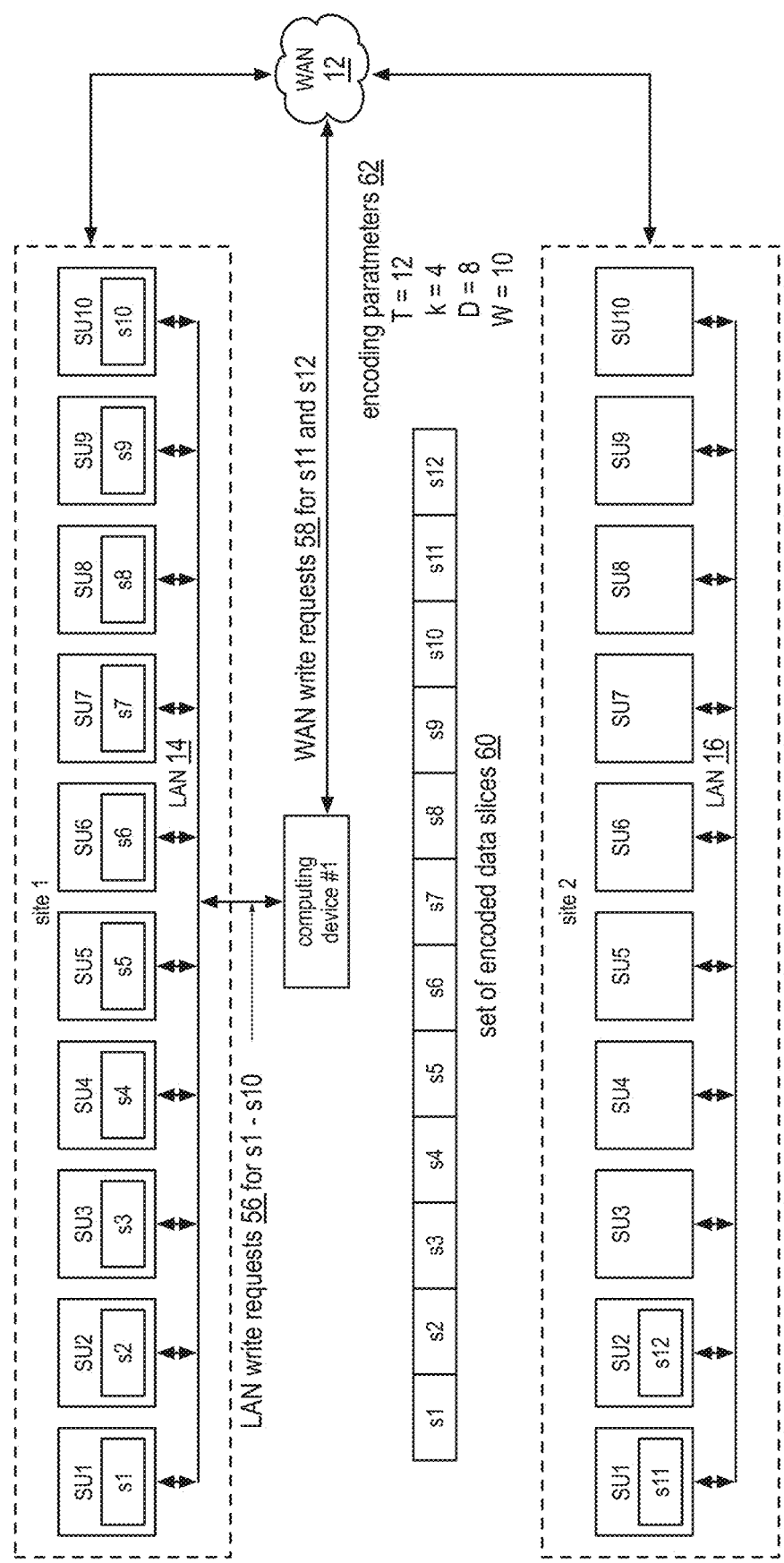
FIGS. 6 and 7 are schematic block diagrams of an example of a write operation to sharing group of sites in accordance with the present invention.
Figure 7:
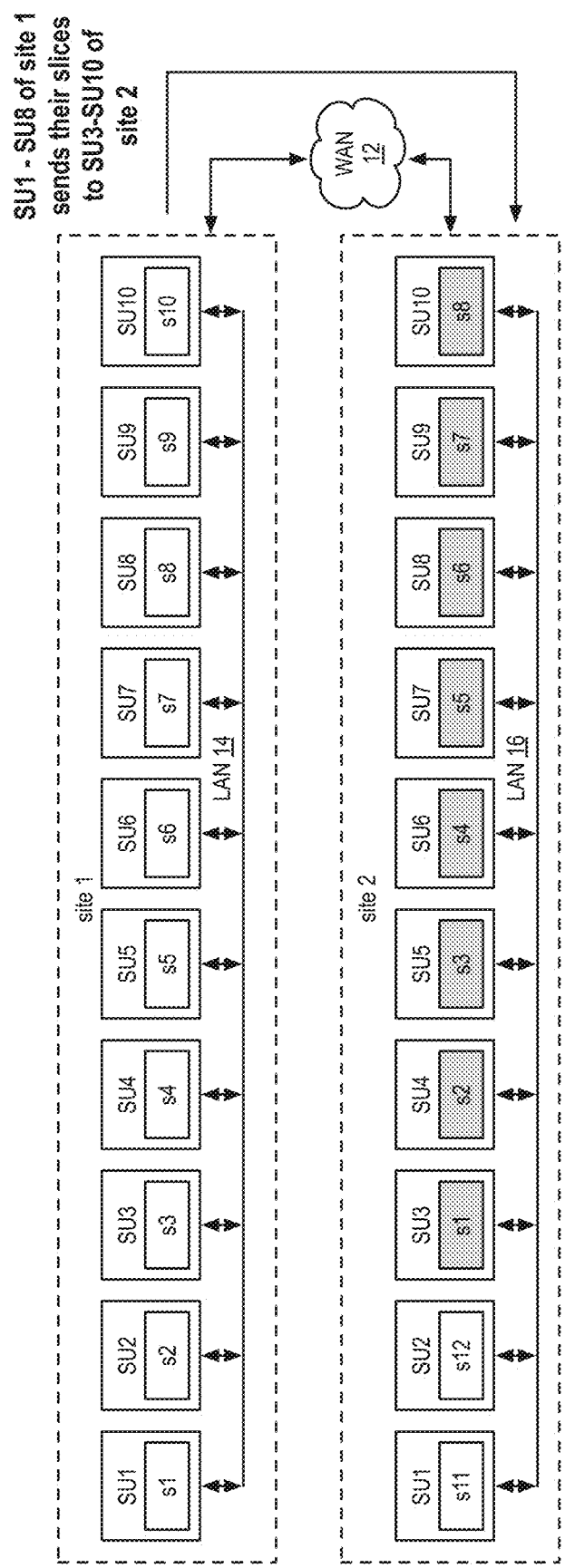

FIGS. 6 and 7 are schematic block diagrams of an example of a write operation by a first computing device to a sharing group of sites of two sites (1 & 2) using the first write pattern of FIG. 3 and the inter-site storage unit relationship 54 of FIG. 5. The computing device #1 encodes a data segment into a set of encoded data slices 60 in an accordance with dispersed storage error encoding parameters 62. The dispersed storage error encoding parameters 62 include a pillar width, or total, number (T) of twelve, a redundancy number (k) of four, a decode threshold number (D) of eight, and a write threshold number (W) of 10. As such, when the computing device #1 encoded the data segment, it produces a set of twelve encoded data slices (s1-s12).

In accordance with the first writing pattern 50, the computing device #1 sends LAN write requests 56 to storage units SU1-SU10 of site 1 regarding encoded data slices s1-s10. The computing device #1 also sends WAN write requests 58 to storage units SU1 and SU2 of site 2 regarding encoded data slices s11 and s12. The storage units of the sites store their respective encoded data slices as shown in FIG. 6.

In FIG. 7, the storage units SU1-SU10 of site 1 and storage units SU1 & SU2 of site 2 use the inter-site storage unit relationship 54 of FIG. 5 to copy slices to the other site. In particular, SU1 of site 1 sends a copy of encoded data slice s1 to storage unit SU3 of site 2 for storage therein. Similarly, SU2 of site 1 sends a copy of encoded data slice s2 to storage unit SU4 of site 2 for storage therein and so on. In this manner, a computing device sends one set of write requests to storage units of sharing group of sites and the storage units within the sharing group propagate copies of the encoded data slices with the group. With multiple copies of a set of encoded data slices, each site in the sharing group can support computing devices affiliated with it allowing for greater data access rates and reduced latency.

Figure 8:
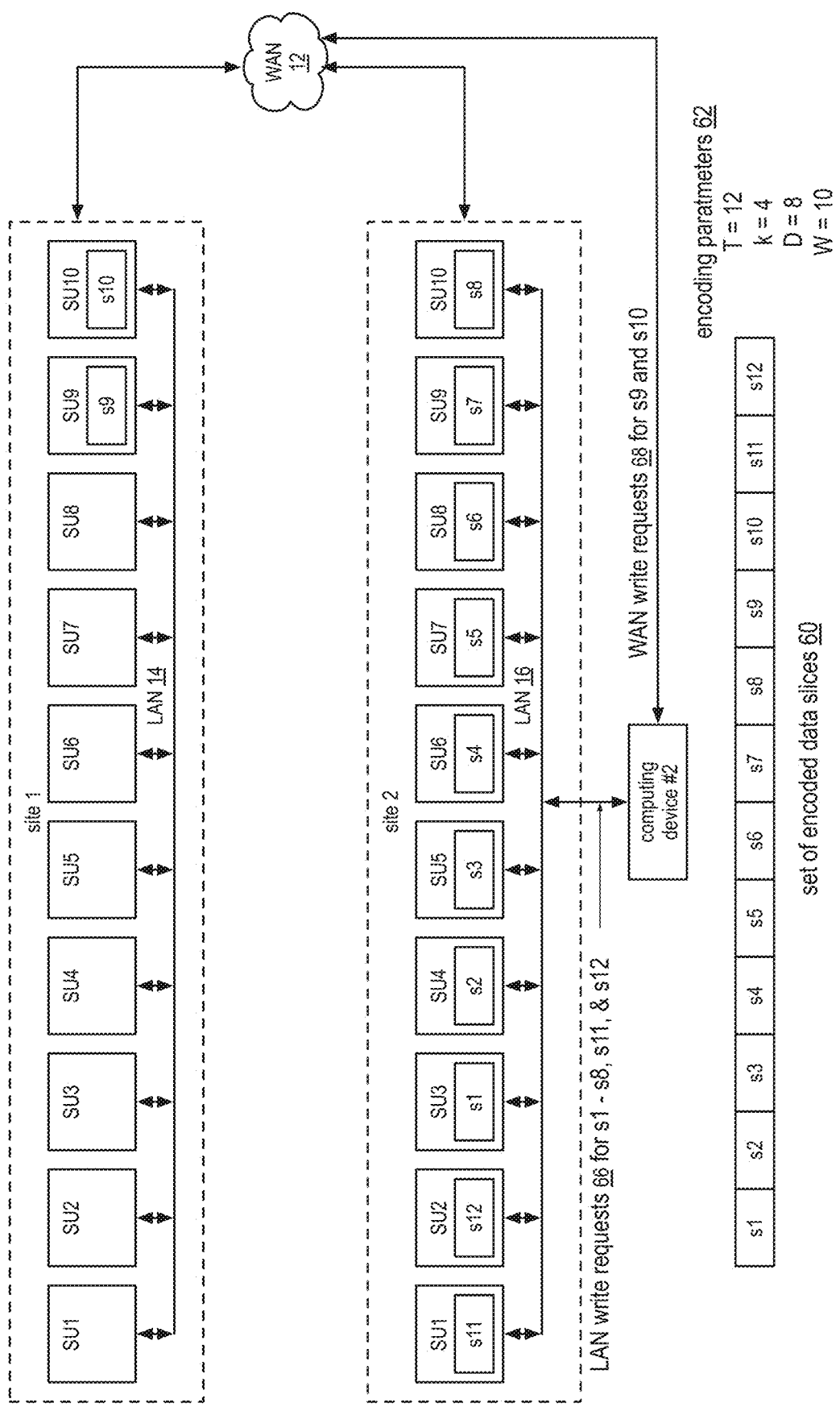
FIGS. 8 and 9 are schematic block diagrams of another example of a write operation to sharing group of sites in accordance with the present invention.
Figure 9:
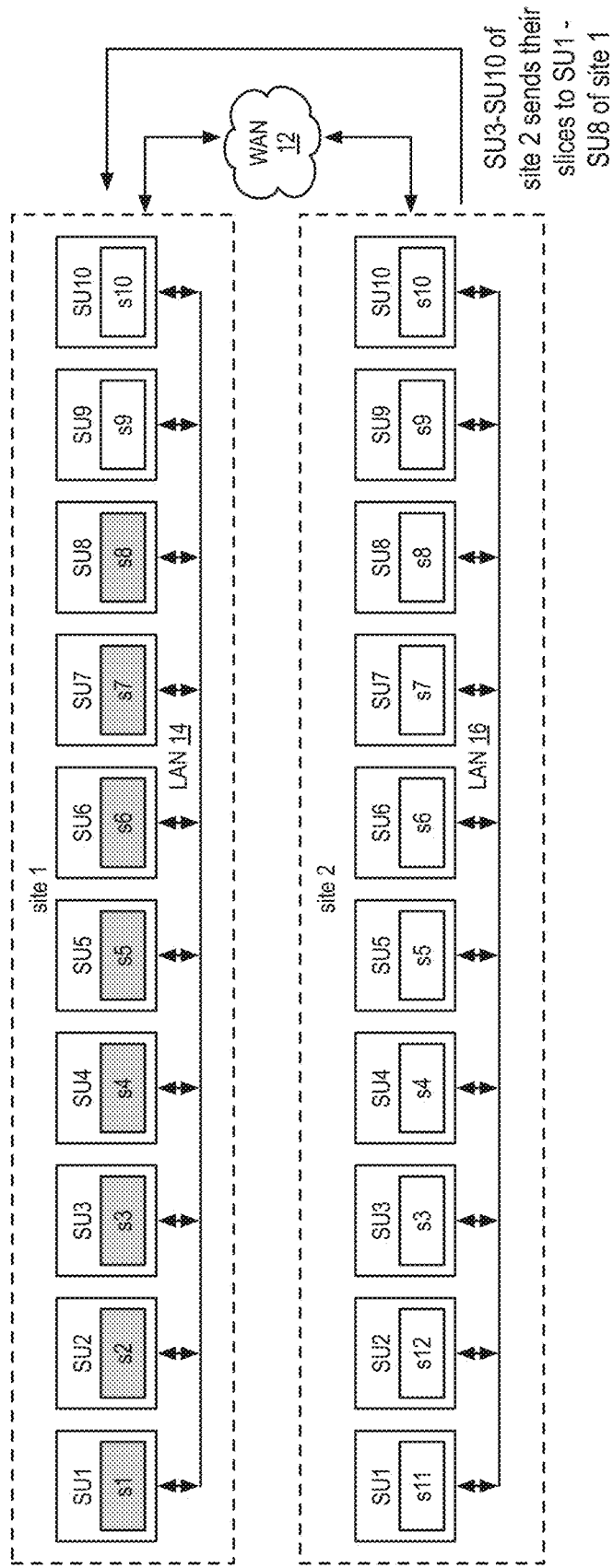

FIGS. 8 and 9 are schematic block diagrams of an example of a write operation by a second computing device to a sharing group of sites of two sites (1 & 2) using the second write pattern of FIG. 4 and the inter-site storage unit relationship 54 of FIG. 5. The computing device #2 encodes a data segment into a set of encoded data slices 60 in an accordance with dispersed storage error encoding parameters 62. The dispersed storage error encoding parameters 62 are the same as in FIGS. 6 and 7.

In accordance with the second writing pattern 50, the computing device #2 sends LAN write requests 66 to storage units SU1-SU10 of site 2 regarding encoded data slices s1-s8, s11, and s12. The computing device #2 also sends WAN write requests 68 to storage units SU9 and SU10 of site 1 regarding encoded data slices s9 and s10. The storage units of the sites store their respective encoded data slices as shown in FIG. 8.

In FIG. 9, the storage units SU1-SU10 of site 1 and storage units SU9 & SU10 of site 1 use the inter-site storage unit relationship 54 of FIG. 5 to copy slices to the other site. In particular, SU3 of site 2 sends a copy of encoded data slice s1 to storage unit SU1 of site 1 for storage therein. Similarly, SU4 of site 2 sends a copy of encoded data slice s2 to storage unit SU2 of site 1 for storage therein and so on.

Figure 10:
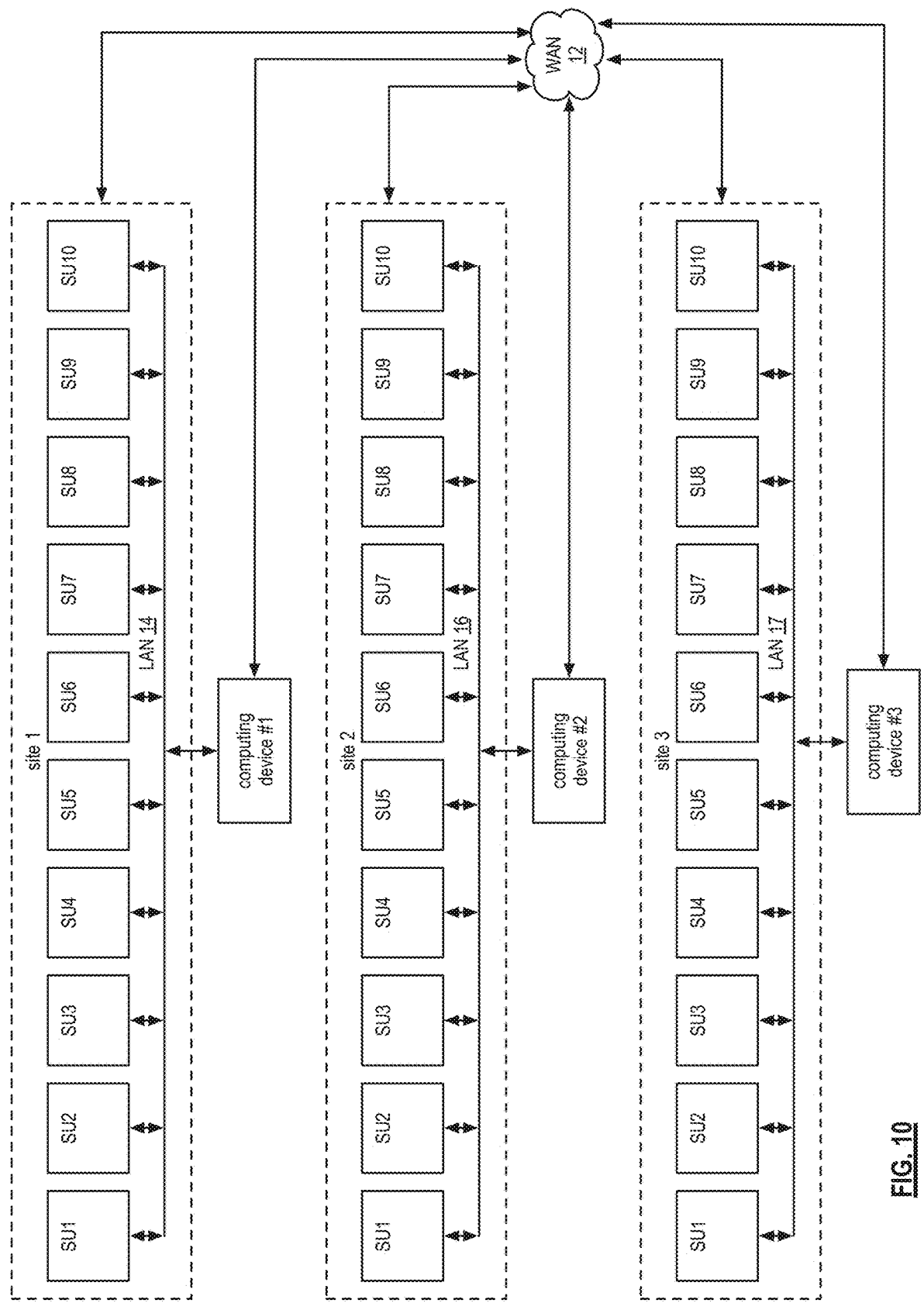
FIG. 10 is a schematic block diagram of another embodiment of a DSN in accordance with the present invention.

FIG. 10 is a schematic block diagram of another embodiment of a DSN that includes three sites (1-3) in a sharing group of sites. Each site includes ten storage units SU1-SU10 and has computing devices affiliated therewith. For example, computing device 1 is affiliated with site 1, computing device 2 is affiliated with site 2, and computing device 3 is affiliated with site 3. FIGS. 11-16 are of an example for the three site sharing group of FIG. 10 and are based on dispersed storage error encoding parameters including a pillar width, or total, number (T) of twelve, a redundancy number (k) of four, a decode threshold number (D) of eight, and a write threshold number (W) of 10.

FIG. 11 is a diagram of another example of a first write pattern 70 and is similar to the first writing pattern 50 of FIG. 5 and FIG. 12 is a diagram of another example of a second write pattern 74 that is similar to the second writing pattern 52 of FIG. 6. FIG. 13 is a diagram of another example of a third write pattern 76 that includes ten encoded data slices (s1-s10) being written to ten storage units (SU1-SU10) of site 3 and the remaining two encoded data slices (s11 & s12) being written to two storage units (SU1 & SU2) of site 2.

FIG. 14 is a diagram of another example of an inter-site storage unit relationship 78 for the three sites. As shown, storage units SU3-SU3 of site 1 have corresponding storage units SU3-SU10 of site 2 and corresponding storage units SU1-SU8 of site 3. Storage units SU1 & SU2 of site 1 do not have corresponding storage units in site 2 but have corresponding storage units SU1 & SU2 in site 3. As is further shown, storage units SU1 and SU2 of site 2 do not have corresponding storage units in either of sites 1 and 3. Note that the write patterns and inter-site storage unit relationship may be different than the examples shown herein provided that the combination has the sites storing the same threshold number of encoded data slices regardless of which computing device initiates the write operation.

Figure 15:
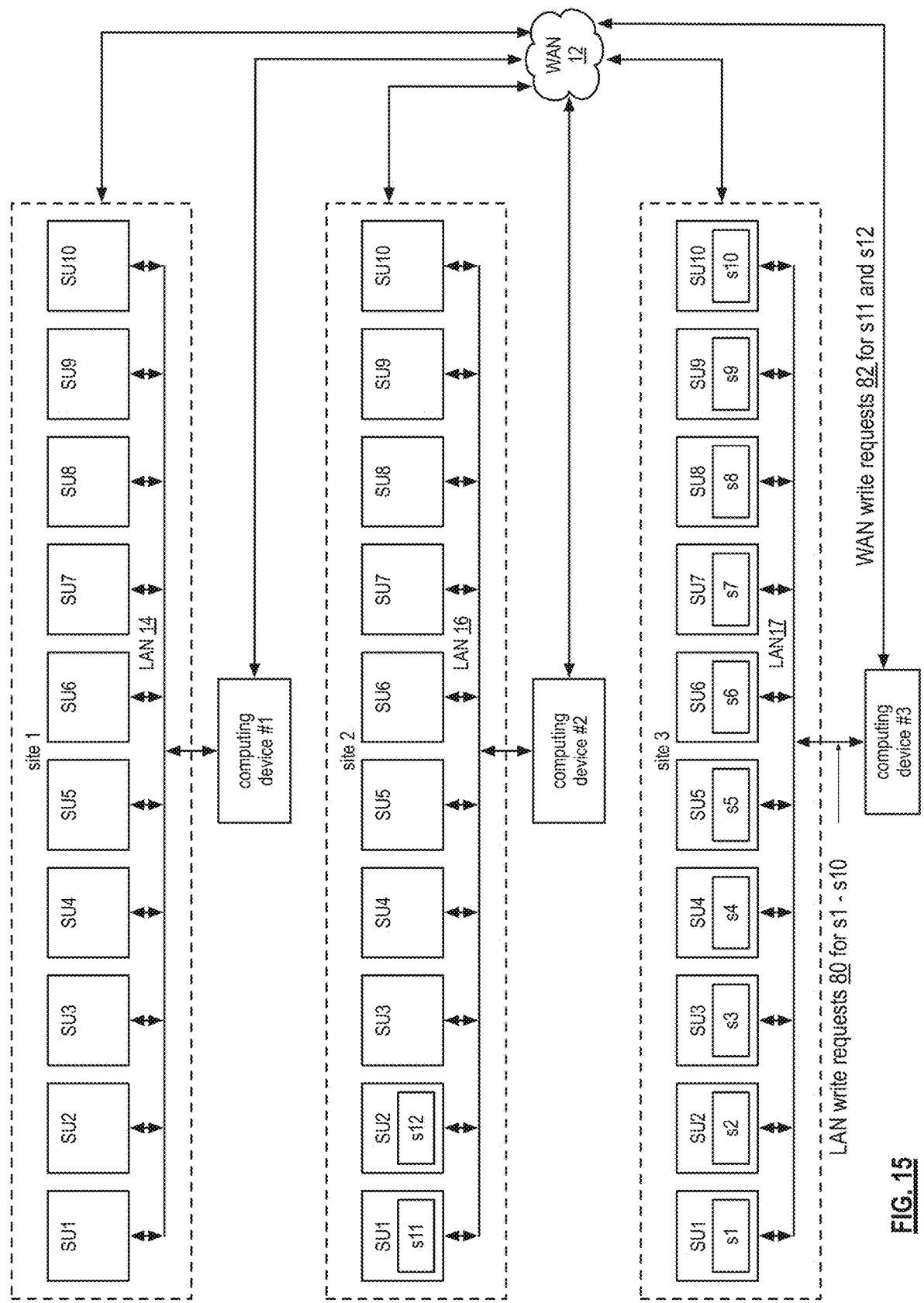
FIGS. 15 and 16 are schematic block diagrams of another example of a write operation to sharing group of sites in accordance with the present invention.
Figure 16:
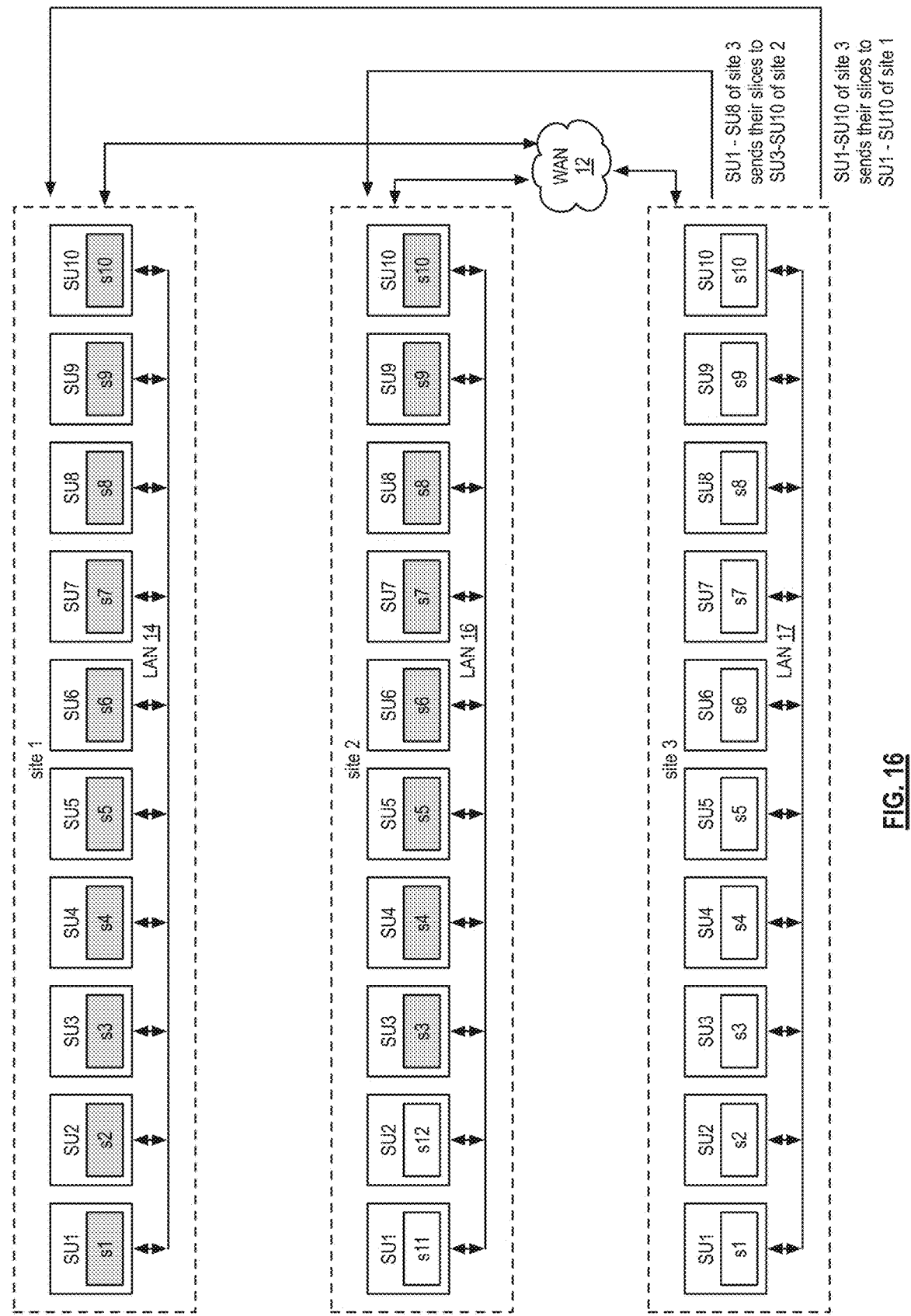

FIGS. 15 and 16 are schematic block diagrams of an example of a write operation by a third computing device to a sharing group of sites of three sites (1-3) using the third write pattern 76 of FIG. 13 and the inter-site storage unit relationship 78 of FIG. 14. The computing device #3 encodes a data segment into a set of twelve encoded data slices (s1-s12) in an accordance with dispersed storage error encoding parameters.

In accordance with the third writing pattern 76, the computing device #3 sends LAN write requests 80 to storage units SU1-SU10 of site 3 regarding encoded data slices s1-s10. The computing device #3 also sends WAN write requests 82 to storage units SU1 and SU2 of site 2 regarding encoded data slices s11 and s12. The storage units of the sites store their respective encoded data slices as shown in FIG. 15.

In FIG. 16, the storage units SU1-SU10 of site 3 and storage units SU1 & SU2 of site 2 use the inter-site storage unit relationship 78 of FIG. 14 to copy slices to storage units of the other sites. In particular, SU1 of site 3 sends a copy of encoded data slice s1 to storage unit SU3 of site 2 and to storage unit SU1 of site for storage therein. Similarly, SU2 of site 3 sends a copy of encoded data slice s2 to storage unit SU4 of site 2 and to storage unit SU2 of site 1 for storage therein and so on. With the use of the write patterns and the inter-site storage unit relationship the storage of the copies of the encoded data slices will be the same regardless of which computing device did the initial writing. Further, with the use of the inter-site storage unit relationship, corrupt or missing encoded data slices can be corrected without the use of rebuilding.

Figure 17:
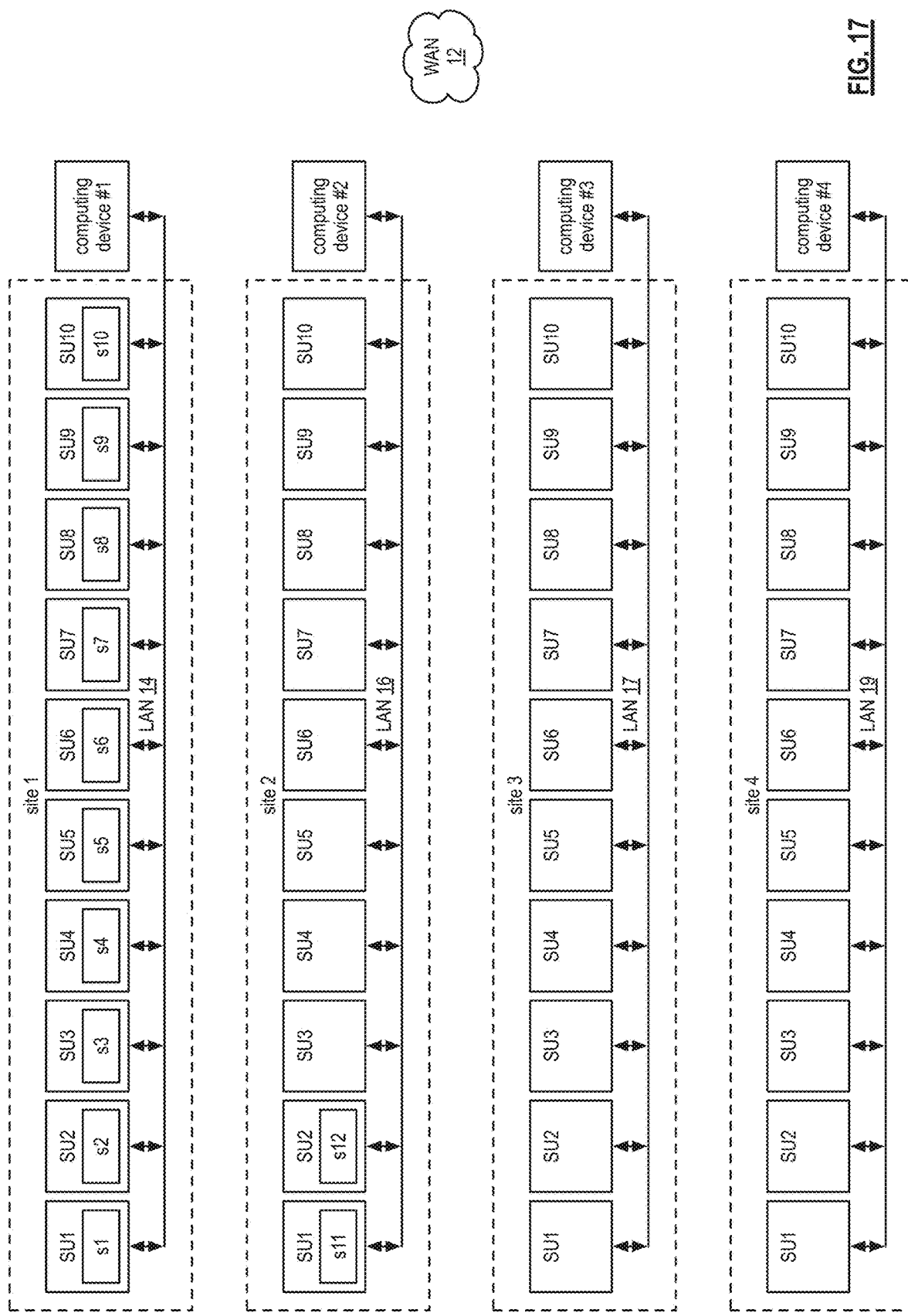
FIG. 17 is a schematic block diagram of another embodiment of a DSN in accordance with the present invention.

FIG. 17 is a schematic block diagram of another embodiment of a DSN that includes four sites (1-4) in a sharing group of sites. Each site includes ten storage units SU1-SU10 and has computing devices affiliated therewith. For example, computing device 1 is affiliated with site 1, computing device 2 is affiliated with site 2, computing device 3 is affiliated with site 3, and computing device 4 is affiliated with site 4. In this example, computing device 1 has encoded a data segment into a set of twelve encoded data slices and stored them in accordance with a first writing pattern. Note that connections between the WAN 12 and the other components are not shown for ease of illustration.

Figure 18:
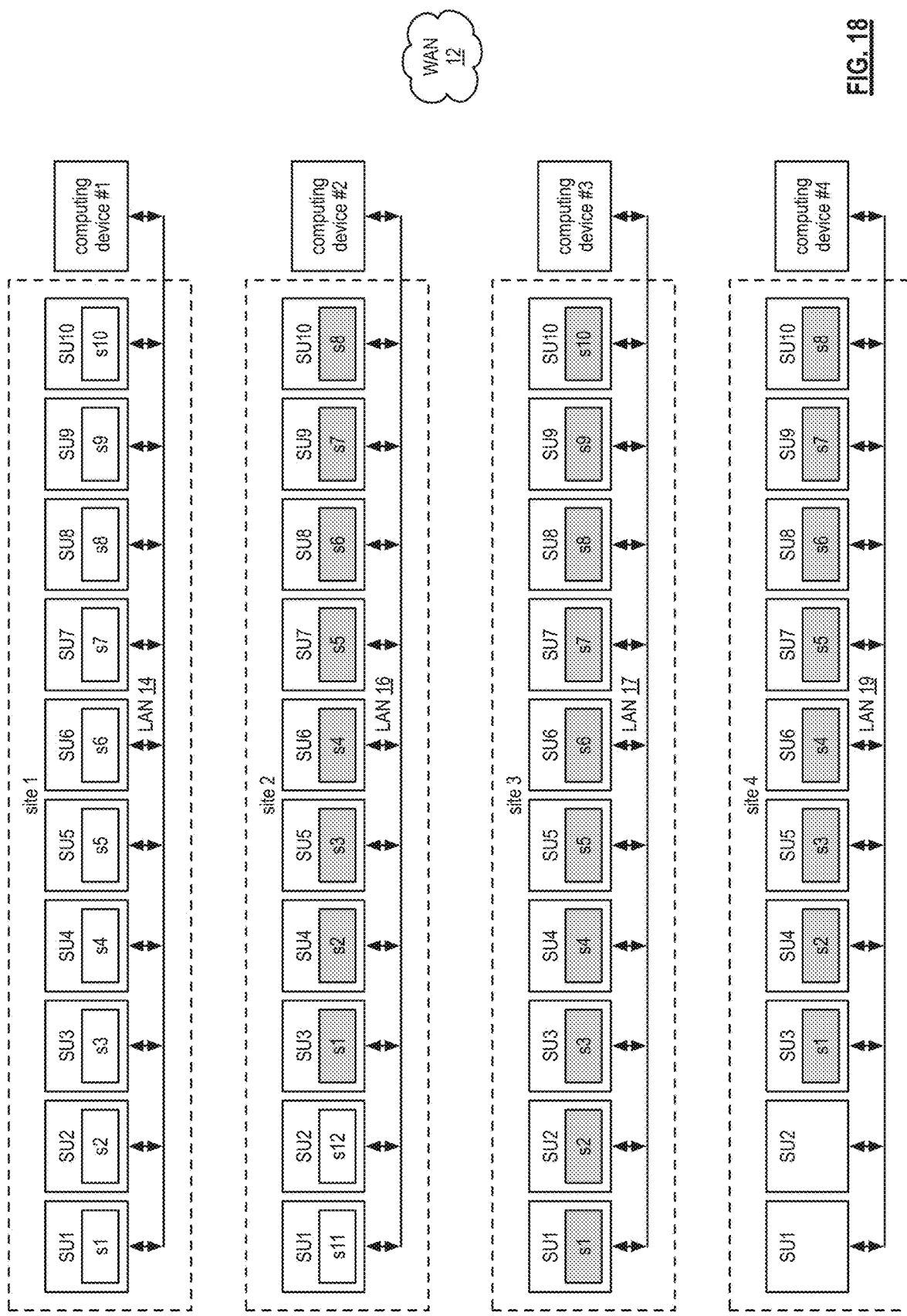
FIGS. 18 and 19 are schematic block diagrams of another example of a write operation to sharing group of sites in accordance with the present invention.

In FIG. 18, the storage units of site 1 use an inter-site storage unit relationship to send copies of their respective slices to other storage units in the sharing group of sites. As shown, storage unit SU1 of site 1 sends its encoded data slice s1 to storage unit SU3 of site 2, to storage unit SU1 of site 3, and to storage unit SU3 of site 4. Similarly, storage unit SU2 of site 1 sends its encoded data slice s2 to storage unit SU4 of site 2, to storage unit SU2 of site 3, and to storage unit SU4 of site 4 and so.

Figure 19:
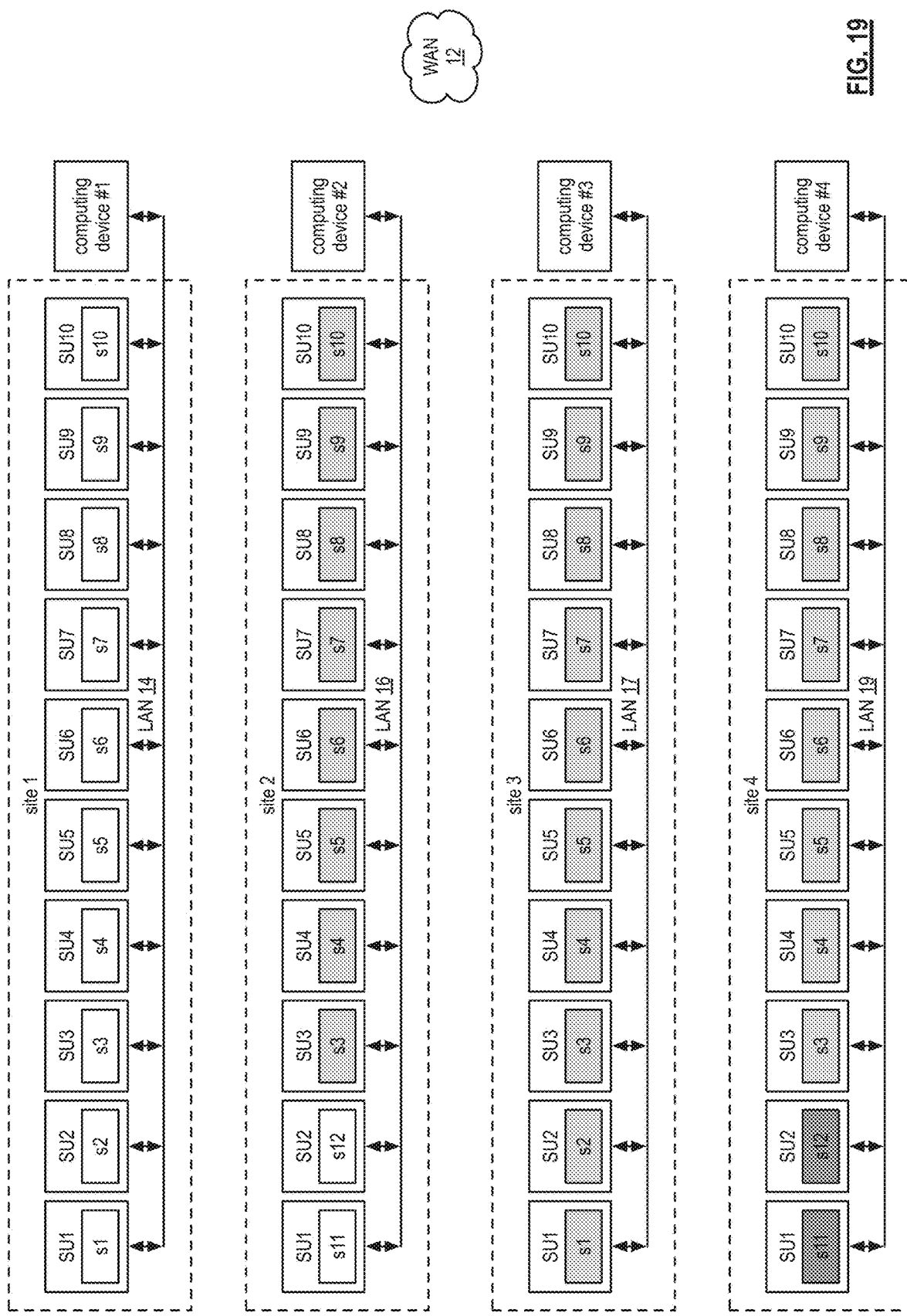

In FIG. 19, the storage units of site 2 use an inter-site storage unit relationship to send copies of their respective slices to other storage units in the sharing group of sites. As shown, storage unit SU1 of site 2 sends its encoded data slice s11 to storage unit SU1 of site 4. Similarly, storage unit SU2 of site 1 sends its encoded data slice s12 to storage unit SU2 of site 4.

Figure 20:
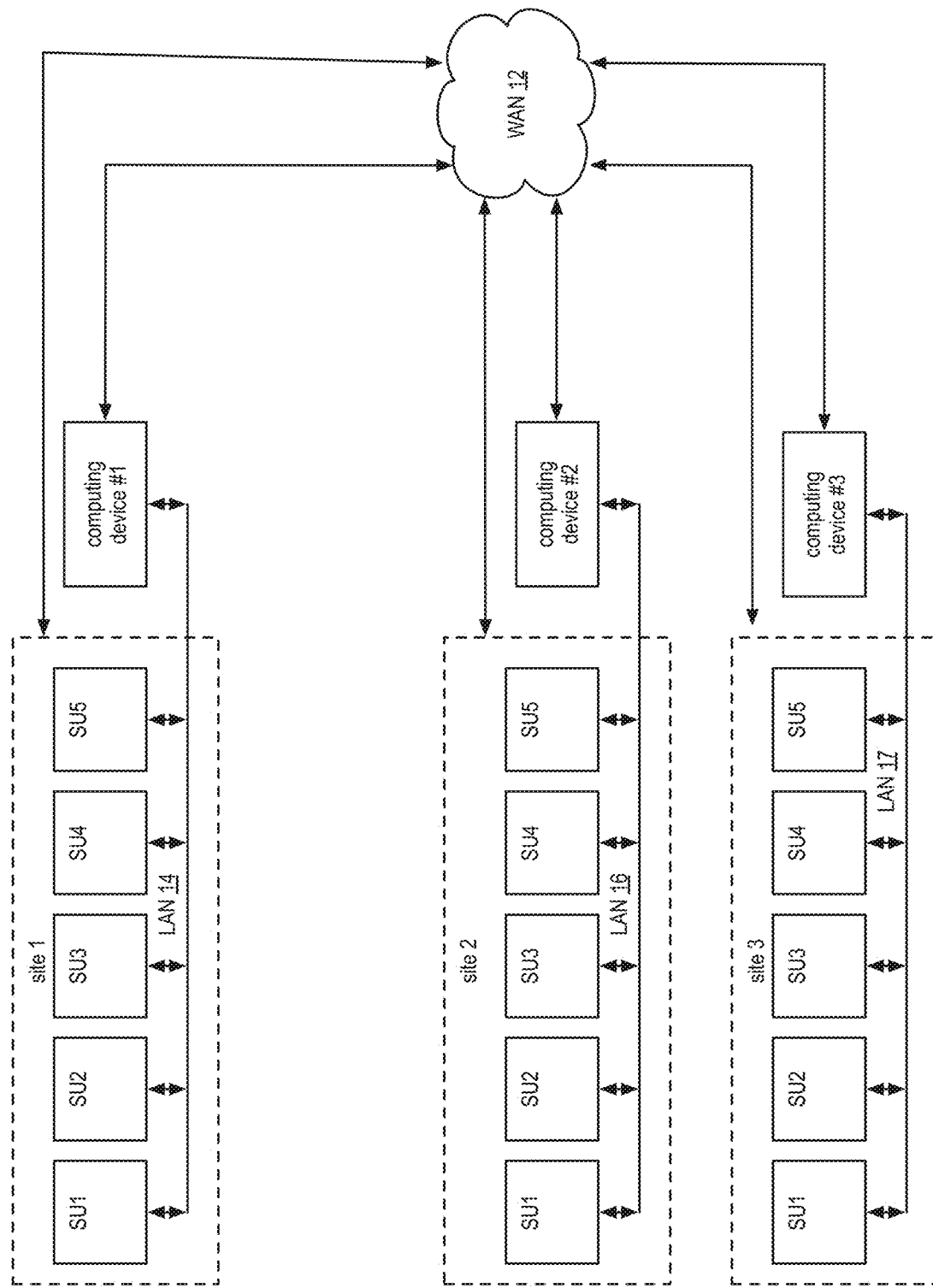
FIG. 20 is a schematic block diagram of another embodiment of a DSN in accordance with the present invention.

FIG. 20 is a schematic block diagram of another embodiment of is a schematic block diagram of another embodiment of a DSN that includes three sites (1-3) in a sharing group of sites. Each site includes five storage units SU1-SU5 and has computing devices affiliated therewith. For example, computing device 1 is affiliated with site 1, computing device 2 is affiliated with site 2, and computing device 3 is affiliated with site 3. FIGS. 21-25 are of an example for the three site sharing group of FIG. 20 and are based on dispersed storage error encoding parameters 62-1 including a pillar width, or total, number (T) of twelve, a redundancy number (k) of nine, a decode threshold number (D) of three, and a write threshold number (W) of five.

FIG. 21 is a diagram of example of a first write pattern 90 for the sharing group of sites of FIG. 20 and the corresponding dispersed storage error encoding parameters. FIG. 22 is a diagram of example of a second write pattern 92 for the sharing group of sites of FIG. 20, and FIG. 23 is a diagram of example of a third write pattern 94 for the sharing group of sites of FIG. 20. FIG. 24 is a diagram of example of an inter-site storage unit relationship 96 for the the sharing group of sites of FIG. 20 and the corresponding dispersed storage error encoding parameters.

FIG. 25 is a schematic block diagram of another example of a write operation to sharing group of sites FIG. 20. In this example, computing device 1 encodes a data segment to produce a set of twelve encoded data slices 60. With a decode threshold of three and a write threshold of five, each site in the sharing group stores five of the twelve encoded data slices, any three of which can be used to recover the data segment. In accordance with the first writing pattern 90 of FIG. 21, the computing device 1 sends LAN write requests to storage units SU1-SU5 of site 1 regarding encoded data slices s1-s5; sends WAN write requests to storage units SU1-SU5 of site 2 regarding encoded data slices s6-s10; and sends WAN write requests to storage units SU1 & SU3 of site 3 regarding encoded data slices s11 & s12. Storage units SU1-SU3 of site 1 use the inter-site storage unit relationship 96 of FIG. 24 to copy their respective encoded data slices s1-s3 to storage units SU3-SU5 of site 3.

Figure 26:
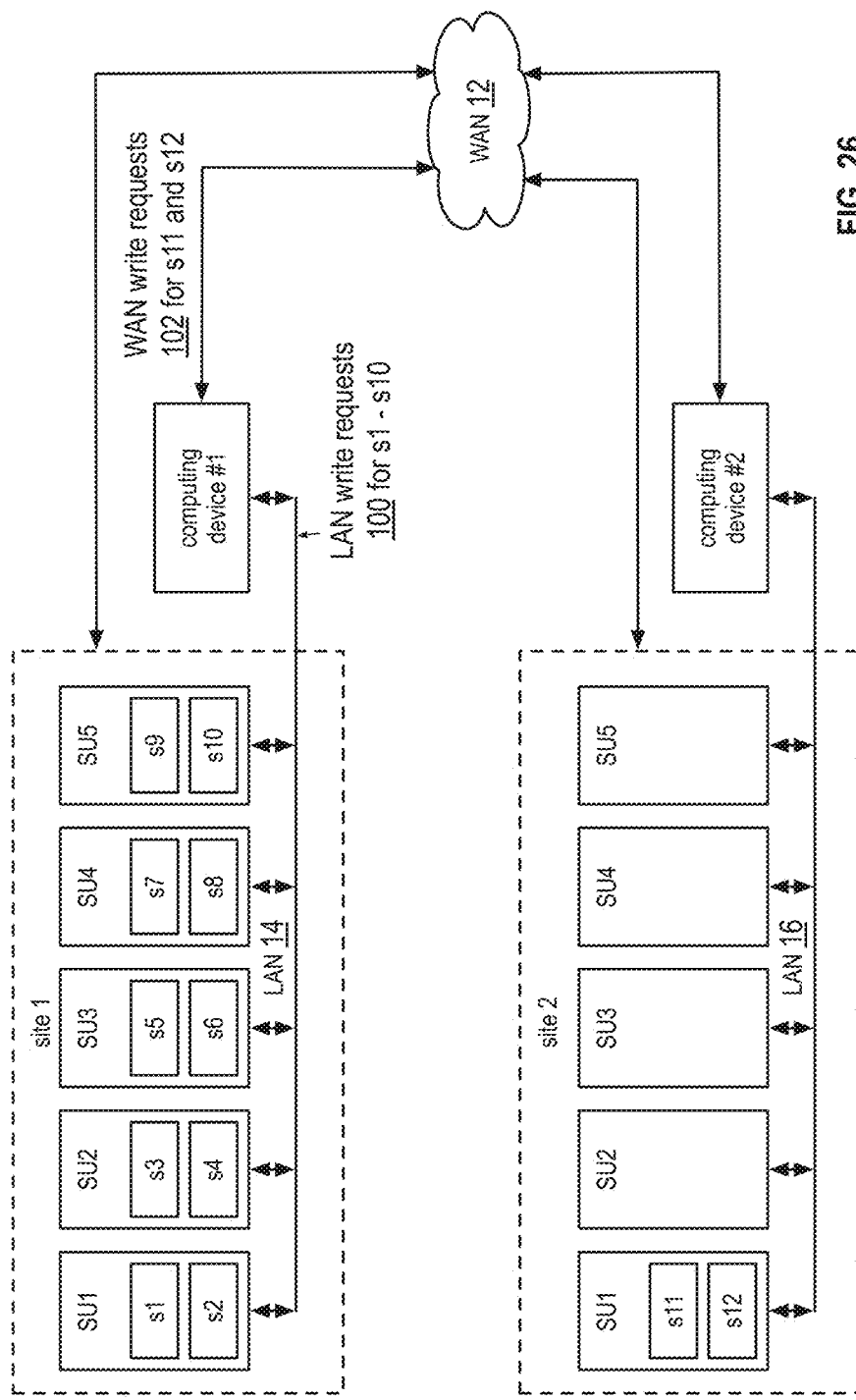

FIG. 26 is a schematic block diagram of another embodiment of is a schematic block diagram of another embodiment of a DSN that includes three sites (1-3) in a sharing group of sites. Each site includes five storage units SU1-SU5 and has computing devices affiliated therewith. For example, computing device 1 is affiliated with site 1, computing device 2 is affiliated with site 2, and computing device 3 is affiliated with site 3. In this example, the dispersed storage error encoding parameters include a pillar width, or total, number (T) of twelve, a redundancy number (k) of four, a decode threshold number (D) of eight, and a write threshold number (W) of 10. Further in this example, each storage unit of each site stores two encoded data slices of the set of encoded data slices.

As shown, computing device 1 encodes a data segment to produce a set of twelve encoded data slices. In accordance with a first writing pattern, the computing device 1 sends LAN write requests 100 for encoded data slices s1-s10 to storage units SU1-SU5 of site 1. Each storage units stores two encoded data slices as shown. In addition, the computing device 1 sends WAN write requests 102 for encoded data slices s11 and s12 to storage unit SU1 of site 2 for storage therein.

In FIG. 27, the storage units SU1-SU4 of site 1 uses an inter-site storage unit relationship to sends copies of their respective encoded data slices s1-s10 to corresponding storage units SU2-SU5 of site 2. As shown, SU1 of site 1 sends a copy of encoded data slices s1 and s2 to storage unit SU2 of site 1, and so on.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A method for execution by a computing device of a dispersed storage network (DSN), the method comprises:
    registering with one or more entities of the DSN, wherein the registering includes indicating that a first storage site is a primary storage site for the computing device, wherein the computing device is connected via a common local area network with the first storage site;
    determining to store a write threshold number of encoded data slices (EDSs) in a first plurality of storage units of the first storage site, wherein the first plurality of storage units are connected via the common local area network, wherein a data object is segmented into a plurality of data segments, wherein each data segment is dispersed error encoded in accordance with dispersed error encoding parameters to produce a pillar width of EDSs;
    obtaining a first writing pattern for storing the write threshold number of EDS s to the first plurality of storage units, wherein the write threshold number of EDSs is less than the pillar width; and
    transmitting at least a portion of a remaining number of EDSs to one or more storage units at a second storage site, wherein the remaining number of EDSs are EDSs not included in the write threshold number of EDS s, wherein the second storage site and the first storage site are each one of a sharing group of storage sites.

2. The method of claim 1, wherein the obtaining a first writing pattern includes at least one of retrieving, creating, requesting and selecting the first writing pattern.

3. The method of claim 1, further comprising: transmitting, by the first storage site, one or more copies of the remaining number of EDS s to a third storage site, wherein the third storage site is one of the sharing group of storage sites and the transmitting is determined based on the first writing pattern.

4. The method of claim 1, further comprising: transmitting one or more copies of the remaining number of EDS s to a third storage site, wherein the third storage site is one of the sharing group of storage sites and the transmitting is determined based on an inter-storage site relationship.

5. The method of claim 1, wherein the transmitting includes instructions for the second storage site to transmit copies of at least a portion of a remaining number of EDSs to a third storage site, wherein the third storage site is one of the sharing group of storage sites and the transmitting is determined based on the first writing pattern.

6. The method of claim 1, wherein the first writing pattern is at least partially determined based on the dispersed error encoding parameters used to produce the pillar width of EDSs.

7. The method of claim 1, further comprising: transmitting instructions for the second storage site to transmit one or more copies of the remaining number of EDSs to a third storage site, wherein the third storage site is one of the sharing group of storage sites.

8. The method of claim 7, wherein the transmitting by the second storage site is determined based on a second writing pattern.

9. The method of claim 7, wherein the transmitting instructions for the second storage site to transmit one or more copies of the remaining number of EDSs to a third storage site includes instructions to store the one or more copies of the remaining number of EDSs based on the first writing pattern and an inter-storage site relationship.

10. The method of claim 7, wherein first storage site, the second storage site and the third storage site are registered respectively with the DSN as home storage sites for a different computing device.

11. A non-transitory computer readable memory device comprises: a first memory device that stores operational instructions that, when executed by a first computing device of a dispersed storage network (DSN), causes the first computing device to:
register with one or more entities of the DSN, wherein the registering includes information indicating that a first storage site is a primary storage site for the computing device, wherein the computing device is connected via a common local area network with the first storage site;
a second memory device that stores operational instructions that, when executed by at least some storage units of a set of storage units of the first storage site, causes the at least some of the storage units of the set of storage units of the first storage site to:
determine to store a write threshold number of encoded data slices (EDSs) to a first plurality of storage units of the first storage site, wherein the first plurality of storage units are connected via the common local area network, wherein a data object is segmented into a plurality of data segments, wherein each data segment is dispersed error encoded in accordance with dispersed error encoding parameters to produce a pillar width of EDSs;
obtain a first writing pattern for storing the write threshold number of EDSs to the first plurality of storage units, wherein the write threshold number of EDSs is less than the pillar width; and
a third memory device that stores operational instructions that, when executed by one or more storage units of one or more other sites of a sharing group of sites, causes the at least some of the storage units of the set of storage units of the first storage site to:
transmit at least a portion of a remaining number of EDSs to one or more storage units at a second storage site, wherein the remaining number of EDSs are EDSs not included in the write threshold number of EDSs, wherein the second storage site and the first storage site are each one of a sharing group of storage sites.

12. The computer readable memory device of claim 11, wherein the first writing pattern is obtained by at least one of retrieving, creating, requesting and selecting the first writing pattern.

13. The computer readable memory device of claim 11, wherein the second memory device further stores operational instructions that, when executed by at least some of the storage units of the set of storage units of the first storage site, causes the at least some of the storage units of the set of storage units of the first storage site to: transmit one or more copies of the remaining number of EDS s to one or more storage units at a third storage site, wherein the third storage site is one of the sharing group of storage sites.

14. The computer readable memory device of claim 13, wherein the second storage site transmits the one or more copies of the remaining number of EDSs to the third storage site based on the first writing pattern.

15. The computer readable memory device of claim 11, wherein the second memory device further stores operational instructions that, when executed by at least some of the storage units of the set of storage units of the first storage site, causes the at least some of the storage units of the set of storage units of the first storage site to: transmit one or more copies of the remaining number of EDS s to one or more storage units at a third storage site, wherein the third storage site is one of the sharing group of storage sites and the one or more copies of the remaining number of EDSs are transmitted based on an inter-storage site relationship.

16. The computer readable memory device of claim 11, wherein the first writing pattern is at least partially determined based on the dispersed error encoding parameters used to produce the pillar width of EDSs.

17. The computer readable memory device of claim 11, wherein the second memory device further stores operational instructions that, when executed by at least some of the storage units of the set of storage units of the first storage site, causes the at least some of the storage units of the set of storage units of the second storage site to: transmit one or more copies of the remaining number of EDS s to one or more storage units at a third storage site, wherein the third storage site is one of the sharing group of storage sites.

18. The computer readable memory device of claim 17, wherein the second storage site transmits the one or more copies of the remaining number of EDSs to the third storage unit based on a second writing pattern.

19. The computer readable memory device of claim 17, wherein the second storage site transmits the one or more copies of the remaining number of EDSs to the third storage unit based on the first writing pattern and an inter-storage site relationship.

20. The computer readable memory device of claim 17, wherein first storage site, the second storage site and the third storage site are registered respectively with the DSN as home storage sites for a different computing device.

* * * * *